(12) United States Patent
Kosaka et al.

(10) Patent No.: US 12,217,486 B2
(45) Date of Patent: Feb. 4, 2025

(54) LEARNING DEVICE, IMAGE PROCESSING DEVICE, PARAMETER GENERATION DEVICE, LEARNING METHOD, AND IMAGE PROCESSING METHOD

(71) Applicant: Sony Group Corporation, Tokyo (JP)

(72) Inventors: Junichi Kosaka, Tokyo (JP); Daisuke Inaishi, Tokyo (JP); Yuma Hirai, Tokyo (JP); Hiroaki Arai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 515 days.

(21) Appl. No.: 17/618,889

(22) PCT Filed: Jun. 27, 2019

(86) PCT No.: PCT/JP2019/025692
§ 371 (c)(1),
(2) Date: Dec. 14, 2021

(87) PCT Pub. No.: WO2020/261503
PCT Pub. Date: Dec. 30, 2020

(65) Prior Publication Data
US 2022/0366674 A1 Nov. 17, 2022

(51) Int. Cl.
*G06T 7/00* (2017.01)
*G06N 20/20* (2019.01)
*G06V 10/774* (2022.01)

(52) U.S. Cl.
CPC ........... *G06V 10/774* (2022.01); *G06N 20/20* (2019.01); *G06T 7/0002* (2013.01); *G06T 2207/20081* (2013.01); *G06T 2207/30168* (2013.01)

(58) Field of Classification Search
CPC ...... G06V 10/774; G06V 10/82; G06V 10/98; G06N 20/20; G06N 20/00; G06T 7/0002;
(Continued)

(56) References Cited

U.S. PATENT DOCUMENTS

2012/0155765 A1  6/2012 Joshi et al.

FOREIGN PATENT DOCUMENTS

JP  2015-88805 A   5/2015
JP  2018-195078 A  12/2018

OTHER PUBLICATIONS

S. Ouni, E. Zagrouba, M. Chambah and M. Herbin, "No-reference Image Semantic Quality Approach using Neural Network," 2011 IEEE International Symposium on Signal Processing and Information Technology (ISSPIT), Bilbao, Spain, 2011, pp. 106-113, doi: 10.1109/ISSPIT.2011.6151543. (Year: 2011).*

(Continued)

*Primary Examiner* — Amandeep Saini
*Assistant Examiner* — Denise G Alfonso
(74) *Attorney, Agent, or Firm* — XSENSUS LLP

(57) ABSTRACT

In a learning device, a first learning unit performs first machine learning using first training data including a first evaluation result for an evaluation target image to generate a first learned model outputting a second evaluation result for an input image, an evaluation unit uses the first learned model to acquire a plurality of the second evaluation results for a plurality of the input images, a generation unit selects a second image quality parameter from a plurality of first image quality parameters having different values, based on the plurality of the second evaluation results and generates second training data including the selected second image quality parameter, and a second learning unit performs second machine learning using the second training data to generate a second learned model outputting a third image quality parameter used for processing a processing target image.

9 Claims, 10 Drawing Sheets

(58) Field of Classification Search
CPC . G06T 2207/20081; G06T 2207/30168; G06T 5/60; G06T 5/90; G06T 2207/20084
See application file for complete search history.

(56) References Cited

OTHER PUBLICATIONS

Gu, Ke, et al. "Learning a no-reference quality assessment model of enhanced images with big data." IEEE transactions on neural networks and learning systems 29.4 (2017): 1301-1313. (Year: 2018).*

International Search Report and Written Opinion mailed on Sep. 17, 2019, received for PCT Application PCT/JP2019/025692, Filed on Jun. 27, 2019, 11 pages including English Translation.

* cited by examiner

LEARNING DEVICE, IMAGE PROCESSING DEVICE, PARAMETER GENERATION DEVICE, LEARNING METHOD, AND IMAGE PROCESSING METHOD

CROSS-REFERENCE TO RELATED APPLICATION

The present application is based on PCT filing PCT/JP2019/025692, filed Jun. 27, 2019, the entire contents of which are incorporated herein by reference.

FIELD

The present disclosure relates to a learning device, an image processing device, a parameter generation device, a learning method, and an image processing method.

BACKGROUND

In order to enhance "image quality" having factors of brightness, contrast, saturation, tone, definition, and the like, an image is processed using parameters (hereinafter, sometimes referred to as "image quality parameters") that change the image quality.

Adjustment of the image quality parameters used for image processing has been performed conventionally by a skilled engineer having the ability of detailed analysis. The skilled engineer observes how the image quality changes depending on image quality parameters variously changed, and determines optimal image quality parameters used for image processing.

CITATION LIST

Patent Literature

Patent Literature 1: Japanese Laid-open Patent Publication No. 2015-088805

SUMMARY

Technical Problem

As the image quality parameters, there are various image quality parameters that change brightness, contrast, saturation, tone, definition, and the like. For example, in a case where there are 28 types of image quality parameters as the image quality parameters and each of the 28 types of image quality parameters has values that can be adjusted in 255 levels, the total number of combinations of the image quality parameters reach an enormous number of "2.4×1067 sets". It is difficult for even the skilled engineer to visually determine an optimal combination from such an enormous number of combinations of image quality parameters.

Furthermore, the optimal image quality parameters are different for each image, and thus, the optimal image quality parameters for a certain image are not always optimal for another image. Therefore, even if one image quality parameter is fixedly applied to a plurality of images, satisfactory image quality may not be obtained.

Therefore, the present disclosure proposes a learning device, an image processing device, a parameter generation device, a learning method, and an image processing method that are configured to reduce a labor required for determining suitable image quality parameters and thereby improve image quality of various images.

Solution to Problem

In one aspect of the disclosed embodiment, a learning device includes a first learning unit that performs first machine learning using first training data including a first evaluation result for an evaluation target image to generate a first learned model outputting a second evaluation result for an input image, an evaluation unit that uses the first learned model to acquire a plurality of the second evaluation results for a plurality of the input images, a generation unit that selects a second image quality parameter from a plurality of first image quality parameters having different values, based on the plurality of the second evaluation results, and generates second training data including the selected second image quality parameter, and a second learning unit that performs second machine learning using the second training data to generate a second learned model outputting a third image quality parameter used for processing a processing target image.

DESCRIPTION OF EMBODIMENTS

Figure 1:
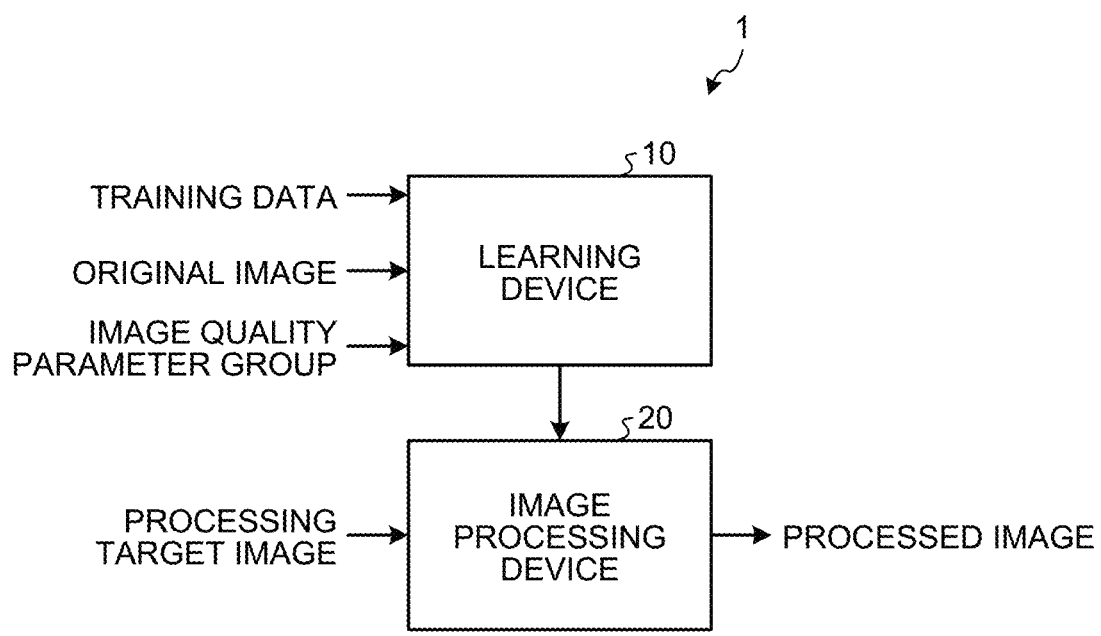
FIG. 1 is a diagram illustrating a configuration example of an image processing system according to a first embodiment of the present disclosure.

Embodiments of the present disclosure will be described below in detail with reference to the drawings. Note that in the following embodiments, the same portions and processing are denoted by the same reference numerals and symbols, and in some cases a repetitive description thereof will be omitted.

Furthermore, the present disclosure will be described in the order of the items shown below.

[First Embodiment]
<Configuration of image processing system>
<Configuration of learning device>
<Configuration of image processing device>
<Processing procedure in image processing system>
[Second Embodiment]
<Processing procedure in image processing system>
[Third Embodiment]
<Configuration of learning device>
<Configuration of image processing device>
[Fourth Embodiment]
<Configuration of image processing device>
[Fifth Embodiment]
<Hardware configuration>
[Effects of disclosed technology]

First Embodiment

Configuration of Image Processing System

FIG. 1 is a diagram illustrating a configuration example of an image processing system according to a first embodiment of the present disclosure. In FIG. 1, the image processing system 1 includes a learning device 10 and an image processing device 20. The learning device 10 uses training data, an original image, and an image quality parameter group to perform machine learning, generates a parameter generation model, and outputs the generated parameter generation model to the image processing device 20. The image processing device 20 uses the parameter generation model input from the learning device 10 to process a processing target image, and acquires a processed image.

Configuration of Learning Device

Figure 2:
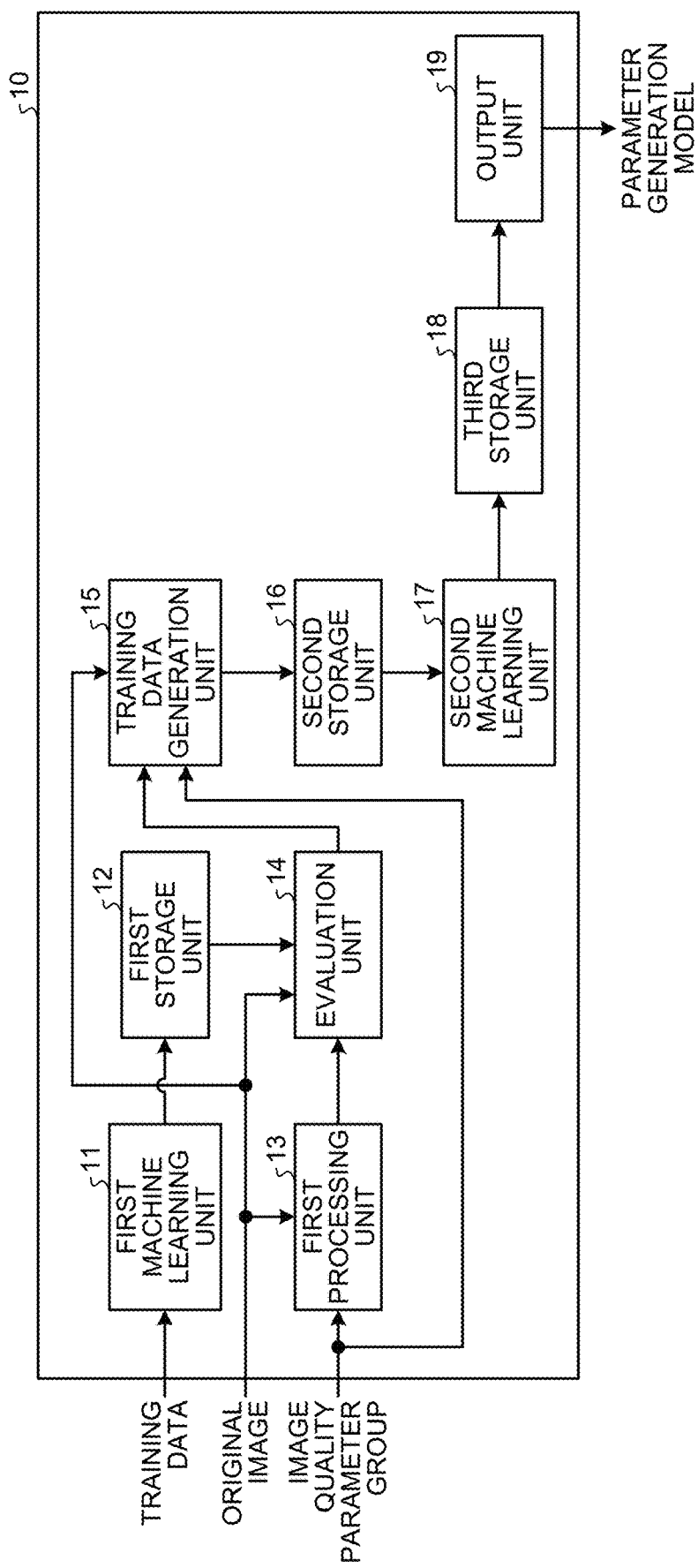
FIG. 2 is a diagram illustrating a configuration example of a learning device according to the first embodiment of the present disclosure.

FIG. 2 is a diagram illustrating a configuration example of the learning device according to the first embodiment of the present disclosure. In FIG. 2, the learning device 10 includes a first machine learning unit 11, a first storage unit 12, a first processing unit 13, an evaluation unit 14, a training data generation unit 15, a second storage unit 16, a second machine learning unit 17, a third storage unit 18, and an output unit 19.

Configuration of Image Processing Device

Figure 3:
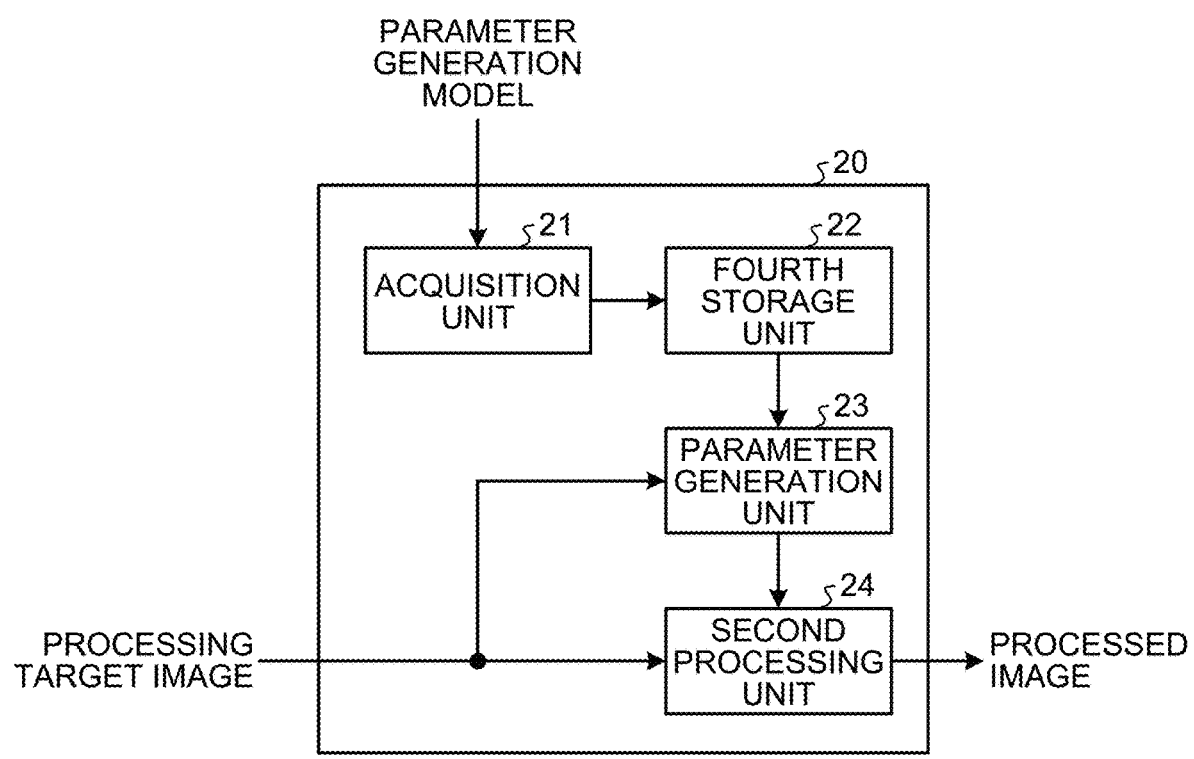
FIG. 3 is a diagram illustrating a configuration example of an image processing device according to the first embodiment of the present disclosure.

FIG. 3 is a diagram illustrating a configuration example of the image processing device according to the first embodiment of the present disclosure. In FIG. 3, the image processing device 20 includes an acquisition unit 21, a fourth storage unit 22, a parameter generation unit 23, and a second processing unit 24.

Processing Procedure in Image Processing System

FIGS. 4 to 8 are diagrams each illustrating an example of a processing procedure in the image processing system according to the first embodiment of the present disclosure.

Figure 4:
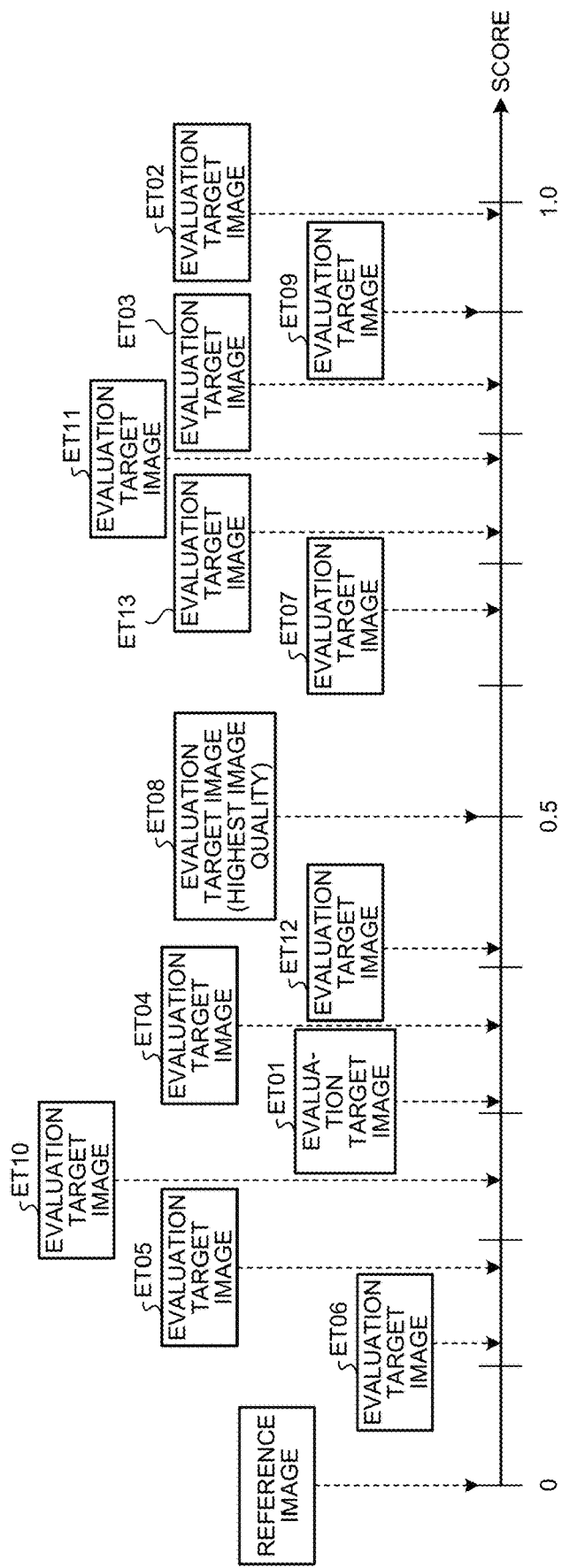
FIG. 4 is a diagram illustrating an example of a processing procedure in the image processing system according to the first embodiment of the present disclosure.

Before the learning device 10 performs processing in the image processing system 1, a human evaluator evaluates an evaluation target image while visually comparing a reference image and the evaluation target image, as illustrated in FIG. 4.

First, the evaluator manually adjusts the image quality parameters, and applies the various image quality parameters having been manually adjusted to the reference image. The reference image is processed using the various image quality parameters having been manually adjusted, and thus, the evaluation target image as a processed image is obtained.

FIG. 4 illustrates, as an example, evaluation target images ET01 to ET13 that are obtained as a result of processing the reference image with image quality parameters having different values.

Then, the evaluator assigns the score of "0" to the reference image, and meanwhile, assigns the score of "0.5" to an evaluation target image having the highest image quality that is visually determined from the image quality gradually changing by adjusting the image quality parameters, for all the obtained evaluation target images. In addition, the evaluator assigns the score of "1.0" to an evaluation target image visually determined to have the largest degree of change with respect to the reference image by excessive adjustment of the image quality parameters. In this way, the evaluator evaluates each evaluation target image by scoring each evaluation target image according to the subjectivity of the evaluator. As a result, for example, as illustrated in FIG. 4, a score of "0.31" is assigned to the evaluation target image ET01, a score of "0.99" is assigned to the evaluation target image ET02, a score of "0.84" is assigned to the evaluation target image ET03, a score of "0.36" is assigned to the evaluation target image ET04, a score of "0.18" is assigned to the evaluation target image ET05, a score of "0.12" is assigned to the evaluation target image ET06, and a score of "0.66" is assigned to the evaluation target image ET07. Furthermore, for example, as illustrated in FIG. 4, a score of "0.50" is assigned to the evaluation target image ET08, a score of "0.90" is assigned to the evaluation target image ET09, a score of "0.25" is assigned to the evaluation target image ET10, a score of "0.78" is assigned to the evaluation target image ET11, a score of "0.41" is assigned to the evaluation target image ET12, and a score of "0.72" is assigned to the evaluation target image ET13. In other words, in the example illustrated in FIG. 4, it is determined that the evaluation target image ET08 has the highest image quality according to the visual subjectivity of the evaluator, and meanwhile it is determined that the image quality of the evaluation target image is gradually lowered in the order of ET08→ET12→ET04→ET01→ET10→ET05→ET06 in image quality, with the image quality of the evaluation target image ET08 as the highest image quality. In addition, it is determined that excessive image quality adjustment is performed on the evaluation target images ET07, ET13, ET11, ET03, ET09, and ET02 having a score larger than 0.5.

Next, the evaluator associates the reference image, the evaluation target images, and the scores with each other, and generates training data TDA including the reference image, the evaluation target images, and the scores. Therefore, for example, training data TDA01 includes the reference image, the evaluation target image ET01, and the score "0.31" that is the score of the evaluation target image ET01, in association with each other, training data TDA02 includes the reference image, the evaluation target image ET02, and the score "0.99" that is the score of the evaluation target image ET02, in association with each other, and the training data TDA03 includes the reference image, the evaluation target image ET03, and the score "0.84" that is the score of the evaluation target image ET03, in association with each other. Likewise, training data TDA04 to TDA13 include the reference images, the evaluation target images ET04 to ET13, and the scores of the evaluation target images ET04 to ET13, in association with each other.

Figure 5:
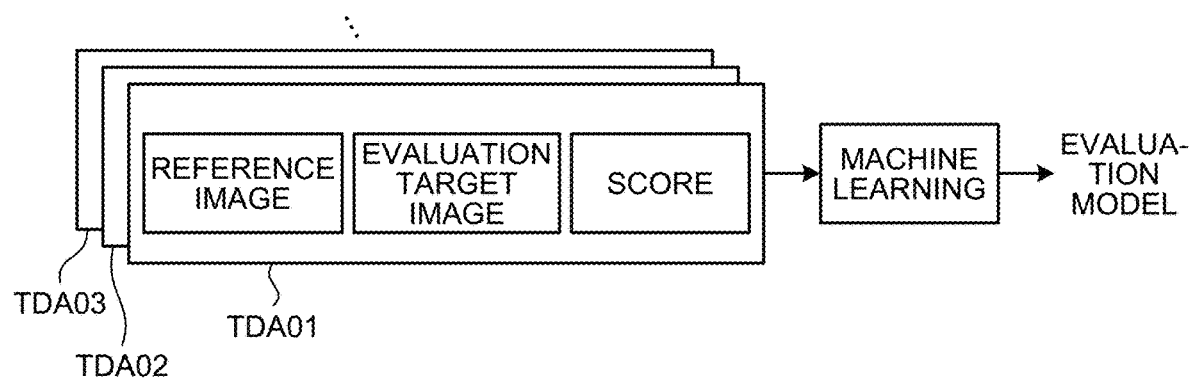
FIG. 5 is a diagram illustrating an example of a processing procedure in the image processing system according to the first embodiment of the present disclosure.

Then, a plurality of sets of training data TDA generated in this way is input to the first machine learning unit 11 (FIG. 2). As illustrated in FIG. 5, the first machine learning unit 11 performs machine learning, as first machine learning, using the plurality of sets of training data TDA, and thereby generates an "evaluation model" as a first learned model. For example, for the machine learning to generate the evaluation model, deep learning such as convolutional neural network (CNN) is used.

The first machine learning unit 11 outputs the evaluation model generated as illustrated in FIG. 5 to the first storage unit 12, and the first storage unit 12 stores the evaluation model generated by the first machine learning unit 11.

After the storage of the evaluation model in the first storage unit 12 is completed, the original image is input to the first processing unit 13, the evaluation unit 14, and the training data generation unit 15, and the image quality parameter group is input to the first processing unit 13 and the training data generation unit 15.

Figure 6:
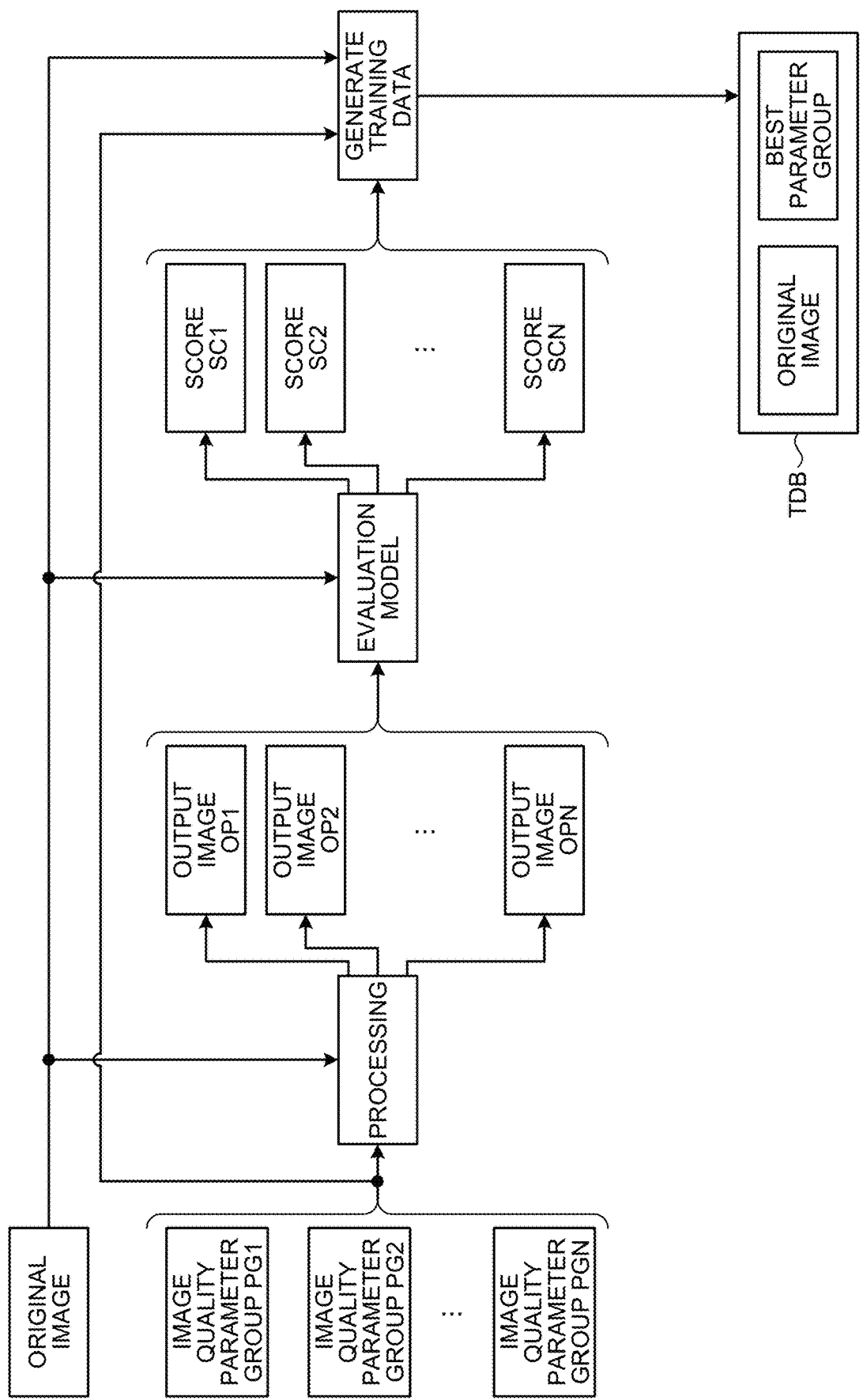
FIG. 6 is a diagram illustrating an example of a processing procedure in the image processing system according to the first embodiment of the present disclosure.

Here, as illustrated in FIG. 6, the original image and, for example, N sets of image quality parameter groups PG1 to PGN are input to the first processing unit 13. Each of the image quality parameter groups PG1 to PGN is a combination of a plurality of types of image quality parameters. For example, each of the image quality parameter groups PG1 to PGN includes four types of image quality parameters of an image quality parameter PA for changing brightness, an image quality parameter PB for changing contrast, an image quality parameter PC for changing saturation, and an image quality parameter PD for changing tone. At least one of the values of the image quality parameters PA, PB, PC, and PD is different between the image quality parameter groups PG1 to PGN. In other words, the image quality parameter groups PG1 to PGN have image quality parameters of different values. The first processing unit 13 processes the original image by using each of the image quality parameter groups PG1 to PGN to acquire output images OP1 to OPN having different image qualities, and outputs the acquired output images OP1 to OPN to the evaluation unit 14. The output image OP1 is an image obtained by processing the original image by using the image quality parameter group PG1, the output image OP2 is an image obtained by processing the original image by using the image quality parameter group PG2, and the output image OPN is an image obtained by processing the original image by using the image quality parameter group PGN. In other words, the output image OP1 corresponds to the image quality parameter group PG1, the output image OP2 corresponds to the image quality parameter group PG2, and the output image OPN corresponds to the image quality parameter group PGN.

The original image and the output images OP1 to OPN are input to the evaluation unit 14. In other words, input images input to the evaluation unit 14 are the original image and the output images OP1 to OPN. The evaluation unit 14 evaluates each of the output images OP1 to OPN by using the evaluation model stored in the first storage unit 12. The evaluation of the output images OP1 to OPN by the evaluation unit 14 is performed similarly to the evaluation of the evaluation target images ET01 to ET13 by the evaluator as described above.

In other words, as described above, the evaluator evaluates the evaluation target images ET01 to ET13 relative to the reference image, and assigns the scores to the evaluation target images ET01 to ET13. In addition, each of the evaluation target images ET01 to ET13 is an image processed by applying different image quality parameters to the same reference image. Then, the first machine learning unit 11 generates the evaluation model by using the training data TDA including the reference image, the evaluation target image, and the score of the evaluation target image that are associated with each other. Meanwhile, the original image and the output images OP1 to OPN are input to the evaluation unit 14, and the evaluation unit 14 evaluates each of the output images OP1 to OPN by using the evaluation model on the bases of the original image and each of the output images OP1 to OPN, and assigns scores SC1 to SCN to the output images OP1 to OPN. In other words, the original image in FIG. 6 corresponds to the reference image in FIG. 4, and the output images OP1 to OPN in FIG. 6 correspond to the evaluation target images ET01 to ET13 in FIG. 4. Therefore, the evaluation of each of the output images OP1 to OPN by using the evaluation model generated by the first machine learning unit 11 makes it possible for the evaluation unit 14 to evaluate the output images OP1 to OPN with a scale similar to that in evaluation of each of the evaluation target images ET01 to ET13 by the evaluator.

The evaluation unit 14 outputs the scores SC1 to SCN that are results of the evaluation of the output images OP1 to OPN, to the training data generation unit 15. The score SC1 indicates the score of the output image OP1, the score SC2 indicates the score of the output image OP2, and the score SCN indicates the score of the output image OPN.

The original image, the image quality parameter groups PG1 to PGN, and the scores SC1 to SCN are input to the training data generation unit 15. As described above, the output images OP1 to OPN correspond to the image quality parameter groups PG1 to PGN, respectively, and the scores SC1 to SCN correspond to the output images OP1 to OPN, respectively. Therefore, the scores SC1 to SCN correspond to the image quality parameter groups PG1 to PGN, respectively. In other words, it can be said that the score SC1 is a result of the evaluation of the image quality parameter group PG1, the score SC2 is a result of the evaluation of the image quality parameter group PG2, and the score SCN is a result of the evaluation of the image quality parameter group PGN.

Therefore, the training data generation unit 15 selects a score having a value of 0.5 or less and a value closest to 0.5 (hereinafter, sometimes referred to as "best score"), from the input scores SC1 to SCN, in accordance with the evaluation method by the evaluator illustrated in FIG. 4. The best score has a value of 0.5 or less and closest to 0.5, and the best score corresponds to the highest result of the evaluation in the evaluation method illustrated in FIG. 4. Next, the training data generation unit 15 selects an image quality parameter group (hereinafter, sometimes referred to as "best parameter group") corresponding to the best score, from the image quality parameter groups PG1 to PGN. The best parameter group is an image quality parameter group corresponding to the best score, and therefore, it can be said that the best parameter group is an image quality parameter group that can provide the highest image quality when the original image is processed, that is, an image quality parameter group optimal to process the original image. Then, the training data generation unit 15 associates the original image with the best parameter group, generates training data TDB including the original image and the best parameter group, and outputs the generated training data TDB to the second storage unit 16. The second storage unit 16 stores the training data TDB generated by the training data generation unit 15.

Therefore, in FIG. 6, it is only required to sequentially input a plurality of M different original images to the learning device 10 to mechanically (automatically) mass-produce a plurality of M sets of training data TDB that include different original images and different best parameter groups.

Here, when all the scores of the input scores SC1 to SCN have a value larger than 0.5 or a value less than a predetermined threshold (e.g., the predetermined threshold=0.3), the training data generation unit 15 may adopt the image quality parameter group having a predetermined value, as the best parameter group.

In addition, an operator may manually adjust the values of the best parameter group selected by the training data generation unit 15.

Furthermore, instead of generating the training data TDB including the original image and the best parameter group, the training data generation unit 15 may generate the training data TDB including a feature amount of the original image and the best parameter group. An example of the feature amount of the original image includes a histogram or the like of the original image.

Figure 7:
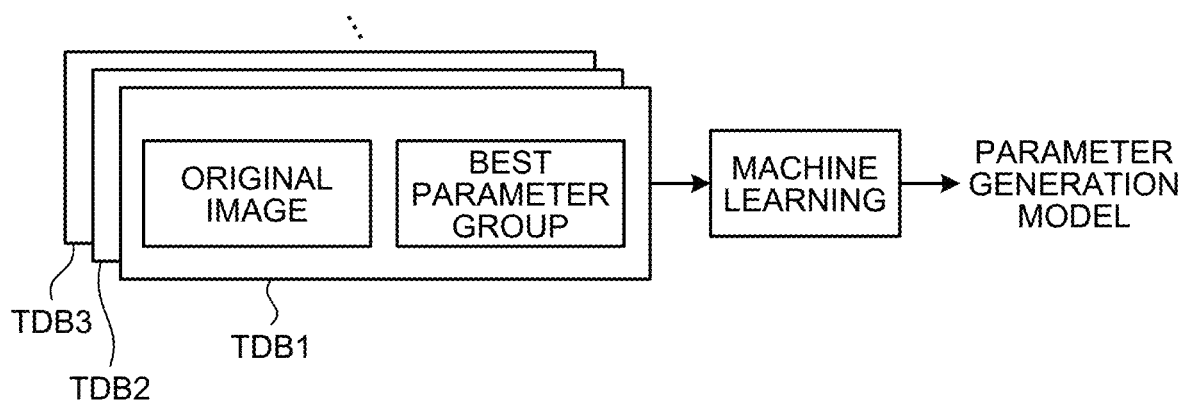
FIG. 7 is a diagram illustrating an example of a processing procedure in the image processing system according to the first embodiment of the present disclosure.

As illustrated in FIG. 7, the second machine learning unit 17 performs machine learning, as second machine learning, using a plurality of sets of training data TDB including training data TDB1 to TDB3 stored in the second storage unit 16, thereby generating the "parameter generation model" as a second learned model. For example, for the machine learning to generate the parameter generation model, deep learning such as CNN is used Each of the training data TDB1 to TDB3 includes the original image and the best parameter group for the original image, and thereby when the processing target image is input, the parameter generation model generated by the second machine learning unit 17 becomes a learned model that outputs the image quality parameter group optimal to process the processing target image.

The second machine learning unit 17 outputs the parameter generation model generated as illustrated in FIG. 7 to the third storage unit 18, and the third storage unit 18 stores the parameter generation model generated by the second machine learning unit 17.

The output unit 19 acquires the parameter generation model stored in the third storage unit 18, and outputs the acquired parameter generation model to the image processing device 20. The output of the parameter generation model from the learning device 10 to the image processing device 20 is performed, for example, in accordance with an instruction given by the operator to the learning device 10.

In the image processing device 20, the acquisition unit 21 acquires the parameter generation model output from the learning device 10, and outputs the acquired parameter generation model to the fourth storage unit 22. The acquisition of the parameter generation model in the image processing device 20 from the learning device 10 is performed, for example, in accordance with an instruction given by the operator to the image processing device 20.

The fourth storage unit 22 stores the parameter generation model acquired by the acquisition unit 21.

In addition, the processing target image is input to the parameter generation unit 23 and the second processing unit 24.

Figure 8:
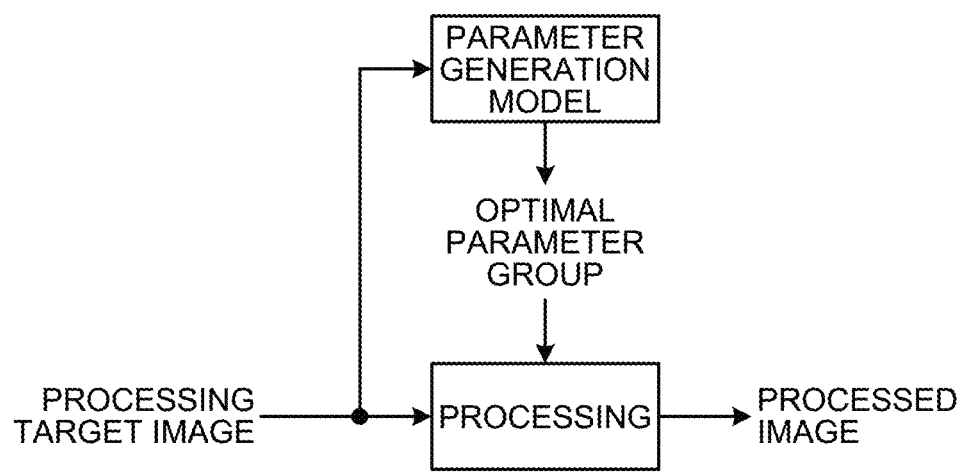
FIG. 8 is a diagram illustrating an example of a processing procedure in the image processing system according to the first embodiment of the present disclosure.

As illustrated in FIG. 8, the parameter generation unit 23 to which the processing target image is input uses the parameter generation model stored in the fourth storage unit 22 to generate the image quality parameter group with which the highest image quality can be obtained upon processing of the processing target image, that is, the image quality parameter group optimal to process the processing target image (hereinafter, sometimes referred to as "optimal parameter group"), and outputs the generated optimal parameter group to the second processing unit 24.

Then, as illustrated in FIG. 8, the second processing unit 24 uses the optimal parameter group to process the processing target image, acquires the processed image, and outputs the acquired processed image. The image quality parameter group used for processing the processing target image by the second processing unit 24 is the optimal parameter group, and thus, the processed image can have the highest image quality.

The first embodiment has been described above.

Second Embodiment

Processing Procedure in Image Processing System

The configurations of the learning device and the image processing device according to a second embodiment of the present disclosure are the same as those of the first embodiment (FIGS. 2 and 3), and the description thereof will be omitted. Hereinafter, different points in the processing procedure between the image processing system according to the second embodiment of the present disclosure and that according to the first embodiment will be described.

The training data generation unit 15 selects a score having any value within a predetermined range from 0.5 (hereinafter, sometimes referred to as "better score"), from the input scores SC1 to SCN in accordance with the evaluation method by the evaluator illustrated in FIG. 4. The better score is a score having any value within a predetermined range from 0.5 (e.g., a score having any value within the range of 0.5±0.1 (i.e., a score having any value of 0.4 or more and less than 0.6)), and the better score corresponds to a good result of the evaluation, in the evaluation method illustrated in FIG. 4. Next, the training data generation unit 15 selects an image quality parameter group (hereinafter, sometimes referred to as "better parameter group") corresponding to the better score, from the image quality parameter groups PG1 to PGN. The better parameter group is an image quality parameter group corresponding to a better score, and therefore, it can be said that the better parameter group is an image quality parameter group that can provide a suitable image quality when the original image is processed, that is, an image quality parameter group suitable to process the original image. Then, the training data generation unit 15 associates the original image with the better parameter group, generates training data TDB including the original image and the better parameter group, and outputs the generated training data TDB to the second storage unit 16. The second storage unit 16 stores the training data TDB generated by the training data generation unit 15.

Therefore, it is only required to sequentially input a plurality of M different original images to the learning device 10 to mechanically (automatically) mass-produce a plurality of M sets of training data TDB that include different original images and different better parameter groups.

The second machine learning unit 17 performs machine learning, as the second machine learning, using a plurality of sets of training data TDB stored in the second storage unit 16, thereby generating the "parameter generation model" as the second learned model. Each of the plurality of sets of training data TDB includes the original image and the better parameter group for the original image, and thereby when the processing target image is input, the parameter generation model generated by the second machine learning unit 17 becomes a learned model that outputs the image quality parameter group suitable to process the processing target image.

Meanwhile, the parameter generation unit 23 to which the processing target image is input uses the parameter generation model stored in the fourth storage unit 22 to generate the image quality parameter group with which the suitable image quality can be obtained upon processing of the processing target image, that is, the image quality parameter group suitable to process the processing target image (hereinafter, sometimes referred to as "suitable parameter group"), and outputs the generated suitable parameter group to the second processing unit 24.

Then, the second processing unit 24 uses the suitable parameter group to process the processing target image, obtains the processed image, and outputs the obtained processed image. The image quality parameter group used for processing the processing target image by the second processing unit 24 is the optimal parameter group, and thus, the processed image can have the suitable image quality.

The second embodiment has been described above.

Third Embodiment

Configuration of Learning Device

Figure 9:
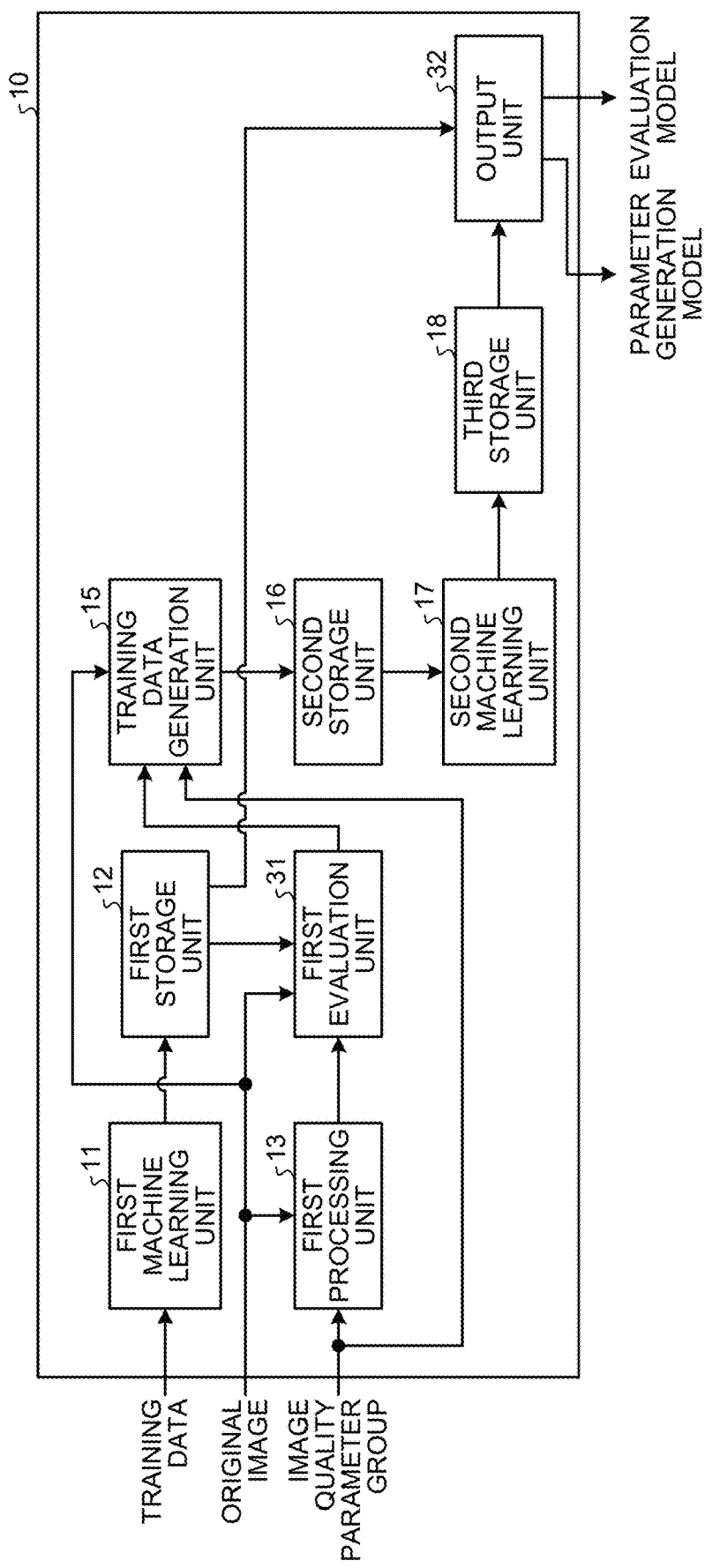
FIG. 9 is a diagram illustrating a configuration example of the learning device according to a third embodiment of the present disclosure.

FIG. 9 is a diagram illustrating a configuration example of the learning device according to a third embodiment of the present disclosure. In FIG. 9, the learning device 10 includes the first machine learning unit 11, the first storage unit 12, the first processing unit 13, a first evaluation unit 31, the training data generation unit 15, the second storage unit 16, the second machine learning unit 17, the third storage unit 18, and an output unit 32. The first evaluation unit 31 performs the same processing as the evaluation unit 14 according to the first embodiment. The output unit 32 acquires the evaluation model stored in the first storage unit 12, and outputs the acquired evaluation model to the image processing device 20. The output unit 32 acquires the parameter generation model stored in the third storage unit 18, and outputs the acquired parameter generation model to the image processing device 20.

Configuration of Image Processing Device

Figure 10:
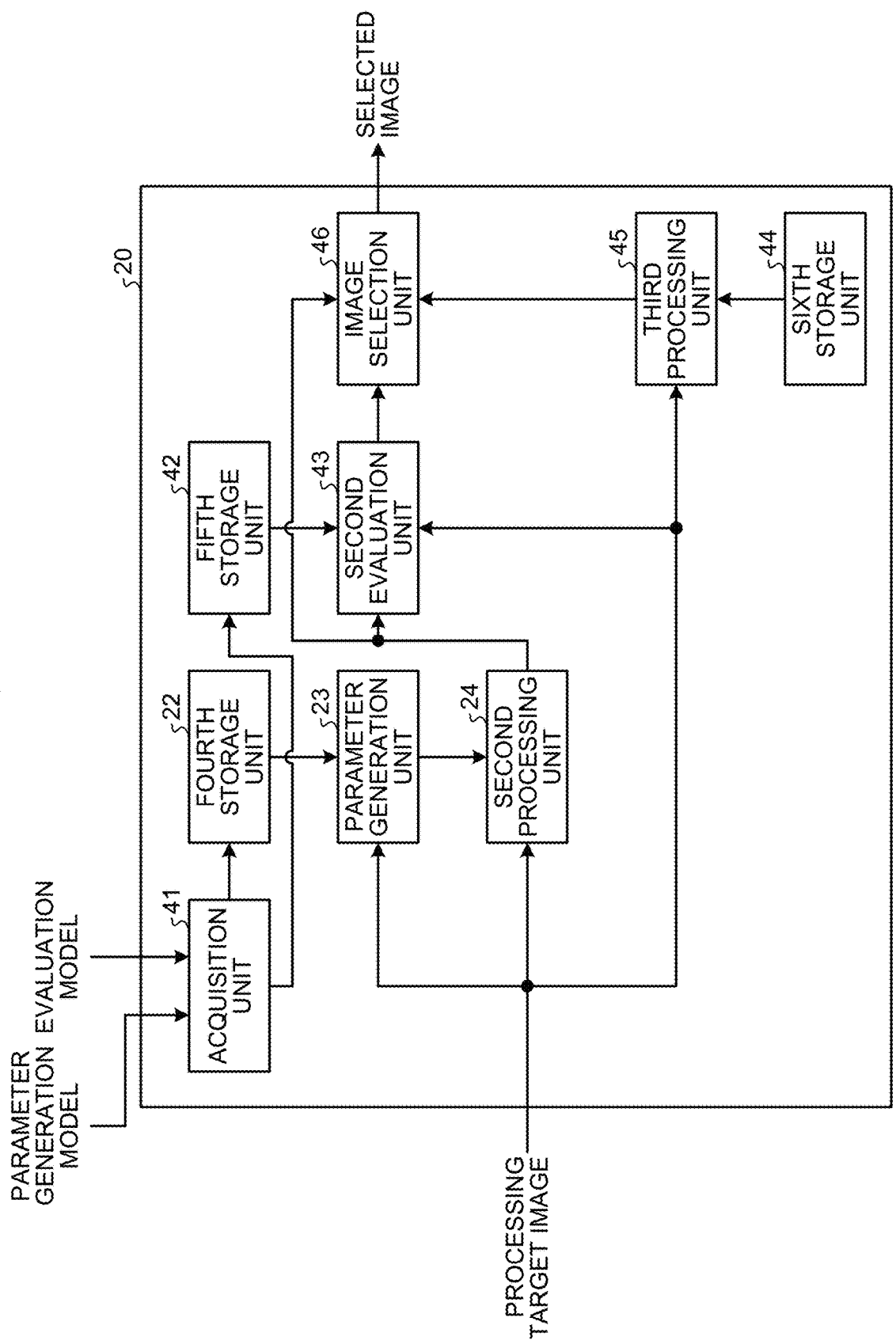
FIG. 10 is a diagram illustrating a configuration example of the image processing device according to the third embodiment of the present disclosure.

FIG. 10 is a diagram illustrating a configuration example of the image processing device according to the third embodiment of the present disclosure. In FIG. 10, the image processing device 20 includes an acquisition unit 41, the fourth storage unit 22, the parameter generation unit 23, the second processing unit 24, a fifth storage unit 42, a second evaluation unit 43, a sixth storage unit 44, a third processing unit 45, and an image selection unit 46.

In FIG. 10, the processing target image is input to the parameter generation unit 23, the second processing unit 24, the second evaluation unit 43, and the third processing unit 45.

The acquisition unit. 41 acquires the evaluation model output from the learning device 10, and outputs the acquired evaluation model to the fifth storage unit 42. In addition, the acquisition unit 41 acquires the parameter generation model output from the learning device 10, and outputs the acquired parameter generation model to the fourth storage unit 22.

The fifth storage unit 42 stores the evaluation model acquired by the acquisition unit 41.

The second processing unit 24 outputs a processed image PIX acquired as in the first embodiment, to the second evaluation unit 43 and the image selection unit 46.

The second evaluation unit 43 receives inputs of the processing target image and the processed image PIX that is acquired by the second processing unit 24. In other words, the input images input to the second evaluation unit 43 are the processing target image and the processed image PIX. The second evaluation unit 43 evaluates the processed image PIX by using the evaluation model stored in the fifth storage unit 42. The second evaluation unit 43 evaluates the processed image PIX similarly to the evaluation performed by the evaluation unit 14 in the first embodiment. In other words, the second evaluation unit 43 uses the evaluation model to evaluate the processed image PIX on the basis of the processing target image and the processed image PIX, and assigns the score to the processed image PIX. In other words, the processing target image input to the second evaluation unit 43 corresponds to the reference image in FIG. 4, and the processed image PIX input to the second evaluation unit 43 corresponds to each of the evaluation target images ET01 to ET13 in FIG. 4. Therefore, the evaluation of the processed image PIX by using the evaluation model generated by the first machine learning unit 11 makes it possible for the second evaluation unit 43 to evaluate the processed image PIX with a scale similar to that in evaluation of each of the evaluation target images ET01 to ET13 by the evaluator. Then, the second evaluation unit 43 outputs a score SCX that is the score of the processed image PIX, to the image selection unit 46.

Meanwhile, the sixth storage unit 44 stores a parameter group PGY having a predetermined fixed value. The parameter group PGY is adjusted to a value with which a standard image quality can be obtained.

The third processing unit 45 uses the parameter group PGY stored in the sixth storage unit 44 to process the processing target image, acquires a processed image PIY, and outputs the acquired processed image PTY to the image selection unit 46.

The image selection unit 46 selects either of the processed image PIX and the processed image PIY on the basis of whether the score SCX satisfies a predetermined condition. For example, the image selection unit 46 selects either of the processed image PIX and the processed image PIY according to the predetermined condition whether the score SCX has a value of 0.5 or less, in accordance with the evaluation method by the evaluator illustrated in FIG. 4. For example, when the score SCX has a value of 0.5 or less (i.e., the score SCX satisfies a predetermined condition), the image selection unit 46 selects processed image PIX, and when the score SCX has a value larger than 0.5 (i.e., the score SCX does not satisfy the predetermined condition), the image selection unit 46 selects the processed image PIY. Then, the image selection unit 46 outputs the selected image as a final processed image.

The third embodiment has been described above.

Note that the third embodiment can be implemented in combination with the second embodiment instead of the first embodiment.

Fourth Embodiment

In a fourth embodiment, the configuration of the learning device is the same as that in the third embodiment, but the configuration of the image processing device is different from that in the third embodiment.

Configuration of Image Processing Device

Figure 11:
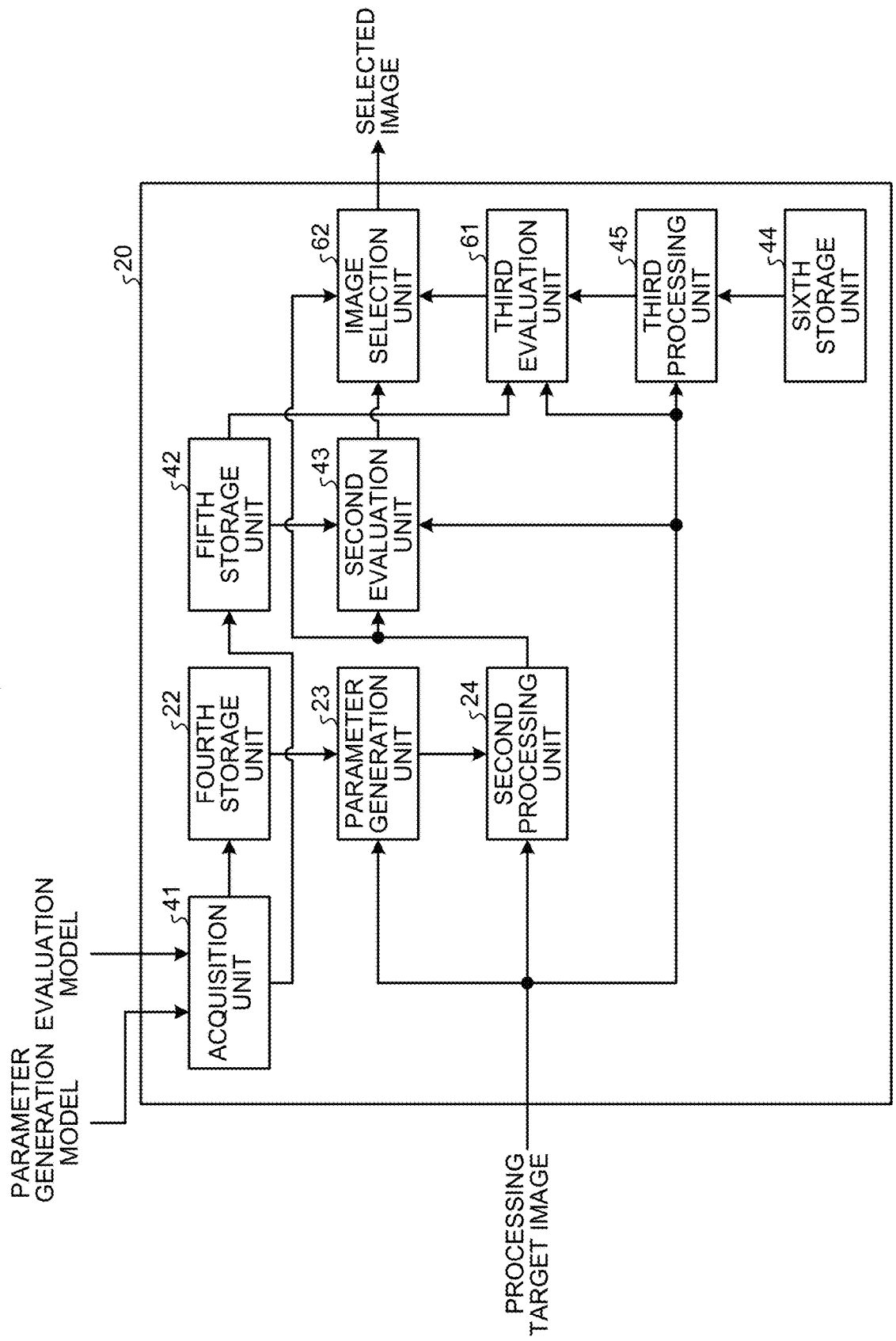
FIG. 11 is a diagram illustrating a configuration example of the image processing device according to a fourth embodiment of the present disclosure.

FIG. 11 is a diagram illustrating a configuration example of the image processing device according to a fourth embodiment of the present disclosure. In FIG. 11, the image processing device 20 includes the acquisition unit 41, the fourth storage unit 22, the parameter generation unit 23, the second processing unit 24, the fifth storage unit 42, the second evaluation unit 43, the sixth storage unit 44, the third processing unit 45, a third evaluation unit 61, and an image selection unit 62.

In FIG. 11, the processing target image is input to the parameter generation unit 23, the second processing unit 24, the second evaluation unit 43, the third processing unit 45, and the third evaluation unit 61.

The second processing unit 24 outputs the processed image PIX acquired as in the first embodiment, to the second evaluation unit 43 and the image selection unit 62.

The second evaluation unit 43 evaluates the processed image PIX in a similar manner to that in the third embodiment, and outputs the score SCX to the image selection unit 62.

The third processing unit 45 acquires the processed image PIY in a similar manner to that in the third embodiment, and outputs the acquired processed image PIY to the third evaluation unit 61.

The third evaluation unit 61 receives inputs of the processing target image and the processed image PIY that is acquired by the third processing unit 45. In other words, the input images input to the third evaluation unit 61 are the processing target image and the processed image PIY. The third evaluation unit 61 evaluates the processed image PIY by using the evaluation model stored in the fifth storage unit 42. The third evaluation unit 61 evaluates the processed image PIY similarly to the evaluation performed by the evaluation unit 14 according to the first embodiment. In other words, the third evaluation unit 61 uses the evaluation model to evaluate the processed image PIY on the basis of the processing target image and the processed image PIY, and assigns the score to the processed image PIY. In other words, the processing target image input to the third evaluation unit 61 corresponds to the reference image in FIG. 4, and the processed image PIY input to the third evaluation unit 61 corresponds to each of the evaluation target images ET01 to ET13 in FIG. 4. Therefore, the evaluation of the processed image PIY by using the evaluation model generated by the first machine learning unit 11 makes it possible for the third evaluation unit 61 to evaluate the processed image PIY with a scale similar to that in evaluation of each of the evaluation target images ET01 to ET13 by the evaluator. Then, the third evaluation unit 61 outputs a score SCY that is the score of the processed image PTY, to the image selection unit 62.

The image selection unit 62 selects any of the processed image PIX and the processed image PTY, on the basis of the score SCX and the score SCY. For example, the image selection unit 46 selects the processed image PIX when the score SCX has a value equal to or larger than that of the score SCY (i.e., a result of the evaluation of the processed image PIX is equal to a result of the evaluation of the processed image PIY, or a result of the evaluation of the processed image PIX is better than a result of the evaluation of the processed image PIY), and selects the processed image PIY when the score SCY has a value larger than that of the score SCX (i.e., a result of the evaluation of the processed image PIY is better than a result of the evaluation of the processed image PIX). Then, the image selection unit 46 outputs the selected image as the final processed image.

The fourth embodiment has been described above.

Note that the fourth embodiment can be implemented in combination with the second embodiment instead of the first embodiment.

Fifth Embodiment

Hardware Configuration

The first storage unit 12, the second storage unit 16, the third storage unit 18, the fourth storage unit 22, the fifth storage unit 42, and the sixth storage unit 44 are implemented as hardware, for example, by a memory, a hard disk drive (HDD), a solid state drive (SSD), and the like. Examples of the memory implementing the first storage unit 12, the second storage unit 16, the third storage unit 18, the fourth storage unit 22, the fifth storage unit 42, and the sixth storage unit 44 include a random access memory (RAM) such as a synchronous dynamic random access memory (SDRAM), a read only memory (ROM), a flash memory, and the like.

The first machine learning unit 11, the first processing unit 13, the evaluation unit 14, the training data generation unit 15, the second machine learning unit 17, the fourth storage unit 22, the parameter generation unit 23, the second processing unit 24, the first evaluation unit 31, the second evaluation unit 43, the third processing unit 45, the image selection units 46 and 62, and the third evaluation unit 61 are implemented as hardware, for example, by a processor. Examples of the processor implementing the first machine learning unit 11, the first processing unit 13, the evaluation unit 14, the training data generation unit. 15, the second machine learning unit 17, the fourth storage unit 22, the parameter generation unit 23, the second processing unit 24, the first evaluation unit 31, the second evaluation unit 43, the third processing unit 45, the image selection units 46 and 62, and the third evaluation unit 61 include a central processing unit (CPU), a digital signal processor (DSP), a field programmable gate array (FPGA), an application specific integrated circuit (ASIC), and the like.

The output units 19 and 32 and the acquisition units 21 and 41 are implemented as hardware, for example, by a wired network interface module or a wireless communication module.

The learning device 10 is implemented, for example, as a computer device such as a personal computer or a server. The image processing device 20 is implemented, for example, as a mobile terminal such as a smartphone or a tablet terminal.

Effects of Disclosed Technology

As described above, the learning device (the learning device 10 in the first embodiment) according to the present disclosure includes a first learning unit (the first machine learning unit 11 according to the first embodiment), an evaluation unit (the evaluation unit 14 in the first embodiment), a generation unit (the training data generation unit 15 in the first embodiment), and a second learning unit (the second machine learning unit 17 in the first embodiment). The first learning unit performs the first machine learning using first training data including a first evaluation result for the evaluation target image to generate the first learned model (the evaluation model in the first embodiment) outputting a second evaluation result for the input image. The evaluation unit uses the first learned model to acquire a plurality of the second evaluation results for a plurality of the input images. The generation unit selects a second image quality parameter from a plurality of first image quality parameters having different values on the basis of the plurality of the second evaluation results, and generates second training data including the selected second image quality parameter. The second learning unit performs second machine learning using the second training data to generate the second learned model (the parameter generation model in the first embodiment) outputting a third image quality parameter used for processing the processing target image.

Meanwhile, the image processing device (the image processing device 20 in the first embodiment) according to the present disclosure includes a generation unit (the parameter generation unit 23 in the first embodiment) and a first processing unit (the second processing unit 24 in the first embodiment). The generation unit generates the third image quality parameter by using the second learned model generated by the learning device (the learning device 10 in the first embodiment). The first processing unit processes the processing target image by using the generated third image quality parameter.

This configuration makes it possible to mechanically (automatically) generate suitable image quality parameters according to various images, reducing the labor required for determining the suitable image quality parameters, thereby improving the image quality of various images.

Furthermore, the first learning unit performs the first machine learning by using the first training data including the reference image, the evaluation target image obtained by processing the reference image, and the first evaluation result indicating an evaluation result of the evaluation target image relative to the reference image.

This configuration makes it possible for the first learning unit to generate the first learned model introducing the experience and know-how of the human evaluator who evaluates the evaluation target image while visually comparing the reference image and the evaluation target image.

Furthermore, the learning device (the learning device 10 in the first embodiment) according to the present disclosure includes a processing unit (the first processing unit 13 in the first embodiment). The processing unit processes the original image by using each of the plurality of first image quality parameters, and acquires a plurality of output images that is obtained by processing the original image by using the plurality of first image quality parameters, the plurality of output images corresponding to the plurality of first image quality parameters. The evaluation unit uses the original image and the plurality of output images as the input images, and acquires the plurality of the second evaluation results corresponding to the plurality of output images.

This configuration makes it possible for the evaluation unit to perform evaluation similar to evaluation by the human evaluator who evaluates the evaluation target image while visually comparing the reference image and the evaluation target image.

Furthermore, the second learning unit performs the second machine learning by using the second training data including the original image and the second image quality parameter.

This configuration makes it possible for the second learning unit to generate the second learned model introducing the experience and know-how of the human evaluator who determines the image quality parameter suitable for the evaluation target image while visually comparing the reference image and the evaluation target image.

Furthermore, the first processing unit acquires a first processed image obtained by processing the processing target image with the third image quality parameter. In addition, the image processing device (the image processing device 20 in the third embodiment) according to the present disclosure includes a second processing unit (the third processing unit 45 in the third embodiment), a second evaluation unit (the second evaluation unit 43 in the third embodiment), and a selection unit (the image selection unit 46 in the third embodiment). The second processing unit processes the processing target image by using a fourth image quality parameter having a predetermined value, and acquires a second processed image obtained by processing the processing target image by using the fourth image quality parameter. The second evaluation unit uses the first learned model to acquire a third evaluation result for the first processed image. The selection unit selects the first processed image when the third evaluation result satisfies a predetermined condition, and selects the second processed image when the third evaluation result does not satisfy the predetermined condition.

This configuration makes it possible to obtain the second processed image having appropriate image quality, for example, even when the first processed image has an inferior image quality that does not satisfy the predetermined condition due to insufficient learning of the first learned model or the second learned model.

Furthermore, the image processing device (the image processing device 20 in the fourth embodiment) according to the present disclosure includes a third evaluation unit (the third evaluation unit 61 in the fourth embodiment) and a selection unit (the image selection unit 62 in the fourth embodiment). The third evaluation unit uses the first learned model to acquire a fourth evaluation result for the second processed image. The selection unit selects the first processed image when the third evaluation result is equal to the fourth evaluation result or when the third evaluation result is better than the fourth evaluation result, and selects the second processed image when the fourth evaluation result is better than the third evaluation result.

This configuration makes it possible to obtain the second processed image having a higher image quality than that of the first processed image, for example, even when the first processed image has an image quality that is inferior due to insufficient learning of the first learned model or the second learned model.

Note that the effects described herein are merely examples, and the present invention is not limited to these effects and may have other effects.

Furthermore, all or part of each processing in the above description in the image processing system 1 may be implemented by causing a processor included in the image processing system 1 to execute a program corresponding to each processing. For example, the program corresponding to each processing in the above description may be stored in a memory so that the program may be read from the memory and executed by the processor. In addition, the program may be stored in a program server connected to the image processing system 1 via any network so as to be downloaded from the program server to the image processing system 1 for execution, or may be stored in a recording medium readable by the image processing system 1 so as to be read from the recording medium for execution. Examples of the recording medium readable by the image processing system 1 include portable storage media, such as a memory card, USB memory, SD card, flexible disk, magnetooptical disk, CD-ROM, DVD, and a Blu-ray (registered trademark) disk. In addition, the program is a data processing method described in any language or by any description method, and may be in any format such as a source code or a binary code. In addition, the program is not necessarily limited to a single program, and also includes programs distributed into a plurality of modules or a plurality of libraries, and a program implementing a function thereof in cooperation with a separate program represented by an OS.

Furthermore, a specific form of distribution/integration of the image processing system 1 is not limited to the illustration, and all or part of the image processing system 1 can be functionally or physically distributed/integrated in any units, according to various additions or the like or according to functional, load.

For example, the acquisition unit 21, the fourth storage unit 22, and the parameter generation unit 23 which are illustrated in FIG. 3 may be configured to be separated from the image processing device 20 so as to be provided in a network server. In this configuration, the image processing device from which the acquisition unit 21, the fourth storage unit 22, and the parameter generation unit 23 are removed transmits the processing target image to the network server by using wireless communication or the like. The network server that has received the processing target image generates the optimal parameter group, and transmits the generated optimal parameter group to the image processing device by using wireless communication or the like. The image processing device that has received the optimal parameter group uses the optimal parameter group received from the network server to process the processing target image, acquires the processed image, and outputs the acquired processed image. The above processing is repeated every time the processing target image is input to the image processing device. Therefore, in this configuration, the network server including the acquisition unit 21, the fourth storage unit 22, and the parameter generation unit 23 functions as a parameter generation device that generates the optimal parameter group.

Furthermore, for example, the image processing device 20 illustrated in FIG. 3 may be configured to be provided in the network server. In this configuration, a communication terminal having a display transmits the processing target image to the network server by using wireless communication or the like. The network server that has received the processing target image generates the optimal parameter group, acquires the processed image by processing the processing target image by using the generated optimal parameter group, and transmits the acquired processed image to the communication terminal by using wireless communication or the like. The communication terminal that has received the processed image displays the received processed image on the display. The above processing is repeated every time the processing target image is input to the communication terminal.

Furthermore, the disclosed technology can also employ the following configurations.

REFERENCE SIGNS LIST

1 IMAGE PROCESSING SYSTEM
10 LEARNING DEVICE
11 FIRST MACHINE LEARNING UNIT
13 FIRST PROCESSING UNIT
14 EVALUATION UNIT
17 SECOND MACHINE LEARNING UNIT
20 IMAGE PROCESSING DEVICE
23 PARAMETER GENERATION UNIT
24 SECOND PROCESSING UNIT

The invention claimed is:

1. A learning device comprising:
processing circuitry configured to
perform first machine learning using first training data including a first evaluation result for an evaluation target image to generate a first learned model outputting a second evaluation result for an input image,
use the first learned model to acquire a plurality of the second evaluation results for a plurality of the input images,
select a second image quality parameter from a plurality of first image quality parameters having different values, based on the plurality of the second evaluation results, and generate second training data including the selected second image quality parameter,
perform second machine learning using the second training data to generate a second learned model outputting a third image quality parameter used for processing a processing target image, wherein a first processed image is obtained by an image processing device by processing the processing target image with the third image quality parameter and a second processed image is obtained by the image processing device by processing the processing target image by using a fourth image quality parameter having a predetermined value,
generate a third evaluation result for the first processed image, and
generate a fourth evaluation result for the second processed image,
wherein the first processed image is selected by the image processing device when the third evaluation result is equal to the fourth evaluation result or when the third evaluation result is better than the fourth evaluation result, and the second processed image is selected by the image processing device when the fourth evaluation result is better than the third evaluation result.

2. The learning device according to claim 1, wherein the processing circuitry is further configured to
perform the first machine learning by using the first training data including a reference image, the evaluation target image obtained by processing the reference image, and the first evaluation result indicating a result of the evaluation of the evaluation target image relative to the reference image.

3. The learning device according to claim 1, wherein the processing circuitry is further configured to
process an original image by using each of the plurality of first image quality parameters, and acquire a plurality of output images that is obtained by processing the original image by using the plurality of first image quality parameters, the plurality of output images corresponding to the plurality of first image quality parameters, and
use the original image and the plurality of output images as the input images, and acquire the plurality of the second evaluation results corresponding to the plurality of output images.

4. The learning device according to claim 3, wherein the processing circuitry is further configured to perform the second machine learning by using the second training data including the original image and the second image quality parameter.

5. An image processing device comprising:
first processing circuitry configured to generate a third image quality parameter by using a second learned model generated by a learning device,
process a processing target image by using the generated third image quality parameter,
acquire a first processed image obtained by processing the processing target image with the third image quality parameter,
process the processing target image by using a fourth image quality parameter having a predetermined value, and acquire a second processed image obtained by processing the processing target image by using the fourth image quality parameter,
use the first learned model to acquire a third evaluation result for the first processed image,
use the first learned model to acquire a fourth evaluation result for the second processed image, and
select the first processed image when the third evaluation result is equal to the fourth evaluation result or when the third evaluation result is better than the fourth evaluation result, and select the second processed image when the fourth evaluation result is better than the third evaluation result,
the learning device including second processing circuitry configured to:
perform first machine learning using first training data including a first evaluation result for an evaluation target image to generate a first learned model outputting a second evaluation result for an input image;
use the first learned model to acquire a plurality of the second evaluation results for a plurality of the input images;
select a second image quality parameter from a plurality of first image quality parameters having different values, based on the plurality of the second evaluation results, and generate second training data including the selected second image quality parameter; and
perform second machine learning using the second training data to generate the second learned model outputting the third image quality parameter used for processing the processing target image.

6. The image processing device according to claim 5, wherein
the first processing unit acquires a first processed image obtained by processing the processing target image with the third image quality parameter, and
the image processing device further comprises:
a second processing unit that processes the processing target image by using a fourth image quality parameter having a predetermined value, and
acquires a second processed image obtained by processing the processing target image by using the fourth image quality parameter;
a second evaluation unit that uses the first learned model to acquire a third evaluation result for the first processed image; and
a selection unit that selects the first processed image when the third evaluation result satisfies a predetermined condition, and selects the second processed image when the third evaluation result does not satisfy the condition.

7. A parameter generation device comprising:
first processing circuitry configured to
acquire, from a learning device, a second learned model generated by the learning device; and
use the acquired second learned model to generate a third image quality parameter,
acquire a first processed image obtained by processing the processing target image with the third image quality parameter,
process the processing target image by using a fourth image quality parameter having a predetermined value, and acquire a second processed image obtained by processing the processing target image by using the fourth image quality parameter,
use the first learned model to acquire a third evaluation result for the first processed image,
use the first learned model to acquire a fourth evaluation result for the second processed image, and
select the first processed image when the third evaluation result is equal to the fourth evaluation result or when the third evaluation result is better than the fourth evaluation result, and select the second processed image when the fourth evaluation result is better than the third evaluation result,
the learning device including second processing circuitry configured to:
perform first machine learning using first training data including a first evaluation result for an evaluation target image to generate a first learned model outputting a second evaluation result for an input image;
use the first learned model to acquire a plurality of the second evaluation results for a plurality of the input images;
select a second image quality parameter from a plurality of first image quality parameters having different values, based on the plurality of the second evaluation results, and generate second training data including the selected second image quality parameter; and
perform second machine learning using the second training data to generate the second learned model outputting the third image quality parameter used for processing the processing target image.

8. A learning method comprising:
performing first machine learning using first training data including a first evaluation result for an evaluation target image to generate a first learned model outputting a second evaluation result for an input image;
using the first learned model to acquire a plurality of the second evaluation results for a plurality of the input images;
selecting a second image quality parameter from a plurality of first image quality parameters having different values, based on the plurality of the second evaluation results;
generating second training data including the selected second image quality parameter;
performing second machine learning using the second training data to generate a second learned model outputting a third image quality parameter used for processing a processing target image, wherein a first processed image is obtained by an image processing device by processing the processing target image with the third image quality parameter and a second processed image is obtained by the image processing device by processing the processing target image by using a fourth image quality parameter having a predetermined value;
generating a third evaluation result for the first processed image; and
generating a fourth evaluation result for the second processed image,
wherein the first processed image is selected by the image processing device when the third evaluation result is equal to the fourth evaluation result or when the third evaluation result is better than the fourth evaluation result, and the second processed image is selected by the image processing device when the fourth evaluation result is better than the third evaluation result.

9. An image processing method comprising:
generating a third image quality parameter by using a second learned model generated by a learning device; and
processing a processing target image by using the generated third image quality parameter,
acquiring a first processed image obtained by processing the processing target image with the third image quality parameter,
processing the processing target image by using a fourth image quality parameter having a predetermined value, and acquire a second processed image obtained by processing the processing target image by using the fourth image quality parameter,
using the first learned model to acquire a third evaluation result for the first processed image,
using the first learned model to acquire a fourth evaluation result for the second processed image, and
selecting the first processed image when the third evaluation result is equal to the fourth evaluation result or when the third evaluation result is better than the fourth evaluation result, and select the second processed image when the fourth evaluation result is better than the third evaluation result,
performing a first machine learning using first training data including a first evaluation result for an evaluation target image to generate a first learned model outputting a second evaluation result for an input image;
using the first learned model to acquire a plurality of the second evaluation results for a plurality of the input images;
selecting a second image quality parameter from a plurality of first image quality parameters having different values, based on the plurality of the second evaluation results, and generating second training data including the selected second image quality parameter; and
performing second machine learning using the second training data to generate the second learned model outputting the third image quality parameter used for processing the processing target image.

* * * * *